United States Patent [19]

Pelosi, Jr. et al.

[11] 3,989,491

[45] Nov. 2, 1976

[54] GAS FILTER AND MOUNTING

[76] Inventors: Michael E. Pelosi, Jr.; Raymond Fink, both of c/o Airo Clean Engineering, Inc., 520 Abbott Drive, Broomall, Pa. 19008

[22] Filed: Aug. 18, 1975

[21] Appl. No.: 605,521

[52] U.S. Cl. .................................. 55/502; 55/481
[51] Int. Cl.[2] .................................. B01D 46/00
[58] Field of Search ............ 55/490, 481, 502, 467, 55/470–473, DIG. 18, DIG. 29; 98/115 LH; 285/230, 231, 345, 363; 210/445, 446

[56] References Cited
UNITED STATES PATENTS

| 813,454 | 2/1906 | Schaad | 285/363 |
|---|---|---|---|
| 2,256,145 | 9/1941 | Hock | 210/445 |
| 2,473,006 | 6/1949 | Campbell et al. | 55/481 |
| 3,502,356 | 3/1970 | Schmunk | 285/230 |
| 3,593,502 | 7/1971 | Pelosi, Jr. | 55/481 |
| 3,729,905 | 5/1973 | Diccianni | 55/DIG. 29 |

Primary Examiner—Bernard Nozick
Attorney, Agent, or Firm—Zachary T. Wobensmith, II; Zachary T. Wobensmith, III

[57] ABSTRACT

A mounting for gaseous fluid filters is disclosed particularly suited for filters of the type which include a rigid box frame within which the filter is carried, the frame having opposite faces open for entrance and exit of the gaseous fluid to be filtered, the mounting including an enclosure with supporting tracks therein for the filter frame, the filter being detachably connected at its upper end to the duct system by a flexible leakproof fabric connection and being sealed at the lower end against leakage.

5 Claims, 4 Drawing Figures

U.S. Patent  Nov. 2, 1976  3,989,491
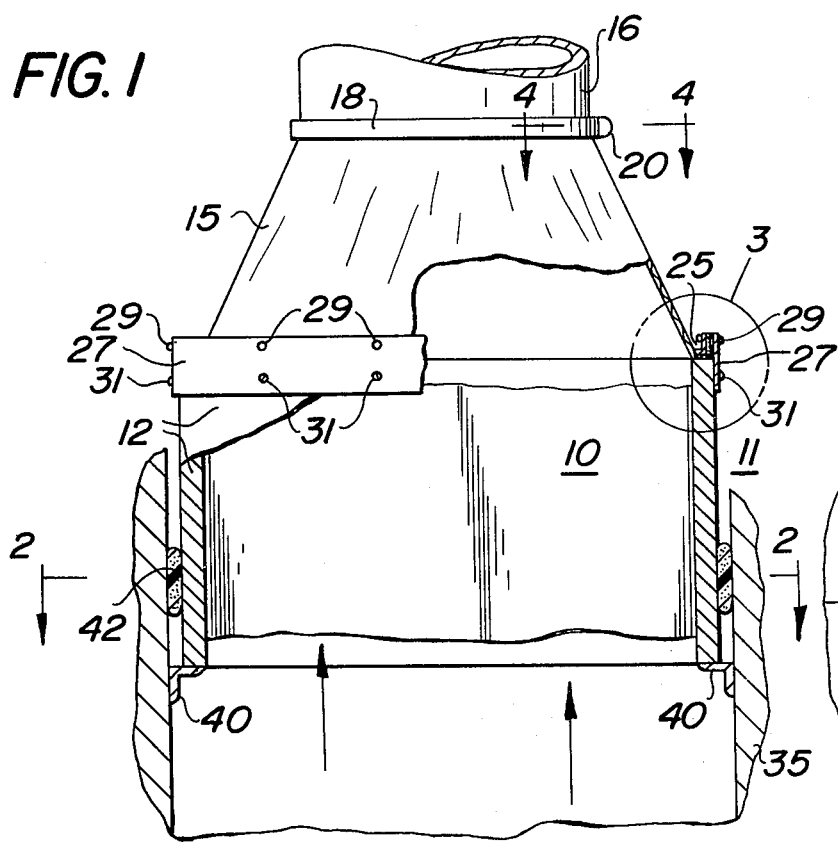
FIG. 1
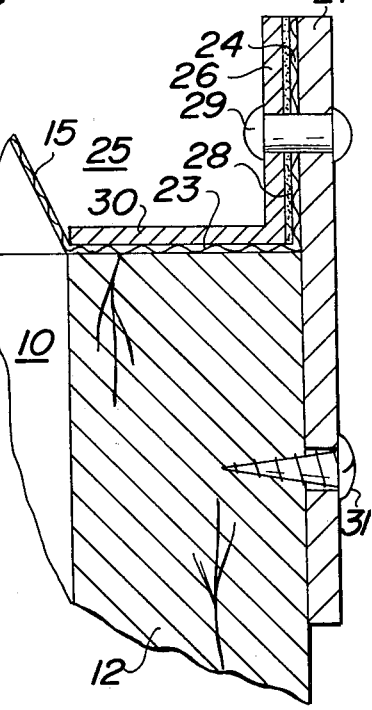
FIG. 3
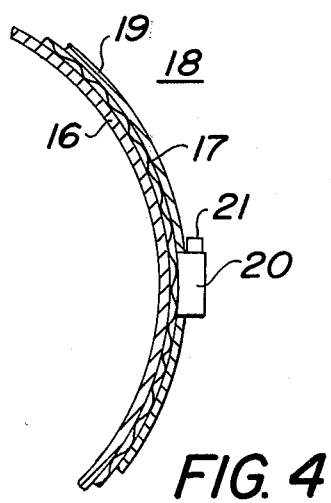
FIG. 2
FIG. 4

GAS FILTER AND MOUNTING

BACKGROUND OF THE INVENTION

1. Field of the Invention

This invention relates to a mounting for a gaseous fluid filter of high efficiency which is suited for ready replacement of the filter when desired.

2. Description of the Prior Art

High efficiency filters which may have an efficiency as high as 99.97 percent are extensively used. These filters cause a large pressure drop in the fluid passing through them which for air may amount to 1 inch of water or more. Such drop due to the high efficiency and consequent high resistance to air passage is inherent. Filters of this type are generally installed in metal frames inside metal ducts. One suitable mounting is shown in U.S. Pat. No. 3,593,502 to Pelosi. This mounting has shortcomings related particularly to the insertion and removal by reason of the manner of central support and the multiple connections above and below the filter. The reliance, also, upon overlapping of fabric to maintain a seal also has disadvantages because of the possibility of damage upon insertion thereby impairing the sealing or separation of the opposite sides of the filter.

SUMMARY OF THE INVENTION

In accordance with the invention a mounting is provided for a high efficiency filter which is leakproof, which can be easily installed and replaced, the filter being supported on rails in a cabinet to which the air is delivered with provisions close to the support for preventing leakage in either direction, and with a flexible fabric attachment to the outlet duct.

It is the principal object of the invention to provide an improved mounting and support for high efficiency filters, which comprises components which can be readily attached to the filter frame and with which replacement of the filter can be readily accomplished.

A further object of the invention is to provide a mounting for a high efficiency filter that is easy to install and replace by untrained personnel.

A further object of the present invention is to provide a mounting for high efficiency filters that is economical to manufacture and to install.

A further object of the present invention is to provide a mounting for high efficiency filters that maintains the sealed characteristics of the filter and its mounting during its useful life.

A further object of the present invention is to provide a mounting for high efficiency filters which is not subject to transmitted vibrations from attached duct work.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a view in elevation of a mounting for filters in accordance with the invention, parts being shown in vertical section to illustrate the construction;

FIG. 2 is a horizontal sectional view, taken approximately on the line 2—2 of FIG. 1;

FIG. 3 is an enlarged fragmentary vertical sectional view, taken at the location 3 of FIG. 1; and FIG. 4 is a fragmentary horizontal sectional view, enlarged, taken approximately on the line 4—4 of FIG. 1.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, a preferred embodiment of the invention is there illustrated.

The mounting as shown, may be installed with air flowing vertically through the filter. A filter 10 which may be any suitable filter with opposite inlet and outlet faces and which is illustrated as a high efficiency particulate air or HEPA filter is provided within a frame 11 of rectangular shape with surrounding rail or wall members 12. The rail or wall members 12 are preferably of wood or other suitable light relatively inert material, and are joined at the respective corners to provide a rigid and airtight boxlike structure.

As can be seen in FIG. 1, the upper face of the filter 10 defines an outlet face while the lower face of the filter 10 defines an inlet face.

An exit transition duct 15 is provided for connection to and extending from a rigid air delivery duct 16 and which duct 15 is of approximately conical shape in cross section. The duct 15 is preferably formed of a laminated flexible inert material, vinyl coated nylon fabric being particularly suitable but other synthetic plastic sheet materials which do not erode, corrode, or abrade may be used as desired. The duct 15 has an outer end or exit portion 17 which is circular as illustrated in FIG. 4, and retained on the duct 16 by an encircling band clamp 18 of well known type. The clamp 18 has an outer band 19, nut 20 and screw member 21. The band 19 can be provided with slots (not shown) wherein threads of screw 21 engage to tighten the band 19 as desired.

The transition duct 15 is preferably connected to the upper or outlet portion of the filter 10 and for this purpose the lower end portion 23 of the duct 15 is preferably connected to the frame 11 in airtight relation. For this purpose the end portion 23 is preferably disposed across the top faces of the rails 12 and then turned upwardly as at 24. The upturned portions are clamped between a vertical leg 26 of angle 25 and an encircling mounting rim 27. A layer of resilient gasketing material 28 such as stabilized synthetic plastic foam is interposed between the leg 25 and the rim 27, rivets 29 retaining the leg 26, gasket layer 28, upturned portion 24 and rim 27 in leak proof engagement.

The horizontal leg 30 of the angle 25 serves to position the transition duct 15 on the frame 11 of the filter 10. The rim 27 is secured to the frame 11 by screws 31.

The filter 10 is preferably carried within the cabinet 35 and has an access door 36 which may be carried on hinges 37 and may have a latch 38. The filter 10 is slidably supported on a pair of opposite horizontal filter support rails 40 for insertion and removal through the access door 36. The cabinet 35, below the support rails 40 can be connected to any suitable source of air to be filtered such as a fan (not shown). A surrounding gasket 42 horizontally disposed above the rails 40 is carried by the frame 11 on the exterior of the frame rails or walls 12. The gasket 42 engaged with the frame 11 and with the interior of the cabinet 35 and access door 36, is preferably of stabilized synthetic plastic foam and by its compression when in position prevents undesired air leakage upward past the filter 10 within the cabinet 35.

The mode of installation and of removal for replacement will be apparent from the foregoing, access through the access door 36 of the cabinet 35 permitting connection or disconnection of the transition duct 45 as desired at the clamping ring 19, and insertion or removal of the filter 10 by sliding the same along the support rails 40.

We claim:

1. In a mounting for a filter for removing particles from gaseous fluids removably mounted within a cabinet in which the cabinet has enclosing walls with horizontal filter supporting rails therein and fluid inlet and outlet connections and the filter has a rigid surrounding frame and exposed upper and lower horizontal faces the improvement which comprises
   a flexible transition duct member connected to said rigid frame contiguous to one of said horizontal faces and to one of said fluid connections, and
   a peripherally disposed gasket member on said rigid frame intermediate the top and bottom thereof for fluid tight engagement with the interiors of said enclosing walls,
   said filter having the lower horizontal face in supported relation to said filter supporting rails,
   said filter having the other of said horizontal faces in communication with the other of said fluid connections.

2. A mounting as defined in claim 1 in which said rigid frame is slidably supported on said frame for insertion and removal.

3. A mounting as defined in claim 1 in which said cabinet has a duct therein communicating with one of said fluid connections and connected to said transition member, and
   an expansible and contractible clamping ring is provided for detachably connecting said duct and said transition member.

4. A mounting as defined in claim 1 in which the members for connecting said transition member to said rigid frame comprise
   an angle member having a horizontal leg for engagement with the frame and a vertical leg, and
   a rim member in secured engagement with said frame and having a portion for engagement with said vertical leg for retaining an end of said transition duct with respect to said frame.

5. A mounting member as defined in claim 4 in which a sealing gasket is interposed in engagement with said end of said transition duct and is retained in position by said rim member.

* * * * *